3,192,946
BREATHER CHECK VALVES
Terje T. Wiersholm, Milwaukee, Wis., assignor to The
Heil Co., Milwaukee, Wis., a corporation of Wisconsin
Filed Apr. 15, 1963, Ser. No. 273,034
4 Claims. (Cl. 137—375)

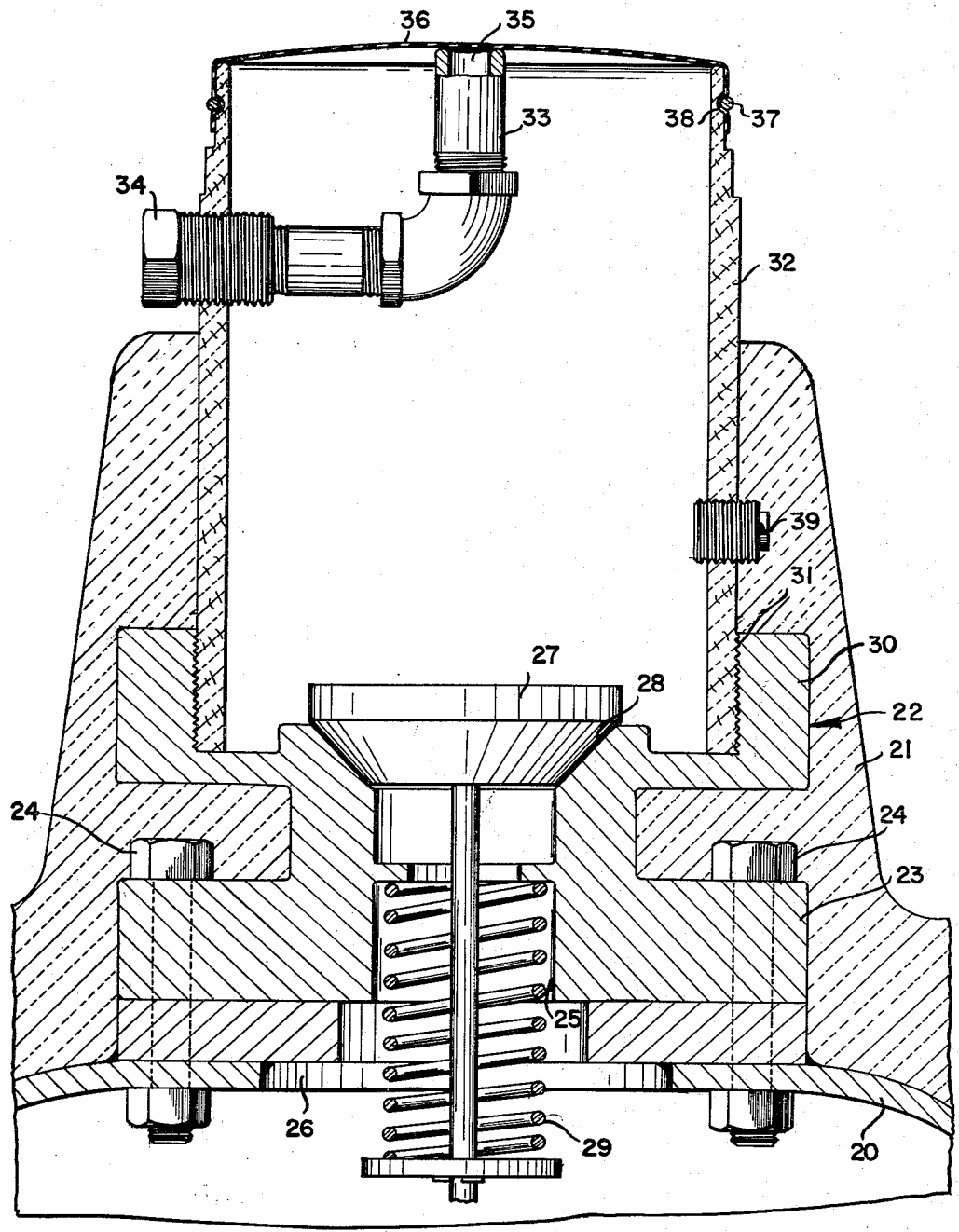

This invention relates to improvements in breather check valves.

When gaseous fluids such as $CO_2$ or the like are stored in a vessel in liquid form they have to be kept under high pressure or extremely low temperature, or a combination of both, in order to maintain the liquid state. In order to accomplish this purpose the tanks have to be well insulated. In addition, for safety reasons, these tanks must be equipped with relief valves. If a conventional relief valve where employed, there would have to be some communication with the exterior, and the moisture in the warm outside air would condense on the cold metal parts of the valve fitting, causing the relief valve to freeze up and preventing the valve from operating.

Heretofore, in order to attempt to minimize this problem, relief valves have been carried on the outer end of relatively long extension pipes or nozzles projecting from the exterior of the vessel, the nozzles being of relatively low thermal-conducting material such as stainless steel. Thus, the valve proper is kept warm to minimize the problem of moisture in the air condensing thereon. This type of construction, however, is objectionable as the relatively long extension pipe creates means for conducting a considerable amount of heat into the tank to reduce considerably the length of time that a fluid of this type can be successfully kept in a liquid state in an insulated tank.

It is a general object of the present invention to provide means whereby the long extension nozzle with its attendant problems can be eliminated, there being a novel construction which permits use of the relief valve directly on the tank, and there being novel means for protecting the valve from the effects of heat and moisture.

A more specific object of the invention is to provide a breather check valve construction as above described wherein the valve is protected by an external tube of low heat conducting material such as plastic reinforced with glass fibers, there being normally closed means for venting leakage from the relief valve to the atmosphere, and there being novel means for opening said vent conduit only when the relief valve is discharging to thereby prevent warm outside air from entering the exhaust tube.

A more specific object of the invention is to provide a construction as above described wherein a pressure-responsive diaphragm is employed for controlling said vent conduit, said diaphragm being frangible in response to abnormal pressures.

With the above and other objects in view, the invention consists of the improved breather check valve, and all of its parts and combinations, as set forth in the claims, and all equivalents thereof.

In the accompanying drawing, illustrating one complete embodiment of the preferred form of the invention, in which the same reference numerals designate the same parts in all of the views:

The drawing shows a longitudinal sectional view through the improved breather check valve and through a portion of an insulated storage tank to which the valve is connected.

Referring more particularly to the drawing, the numeral 20 designates a tank in which a fluid such as $CO_2$ is adapted to be stored at a sufficiently high pressure, or at a sufficiently low temperature, or at a combination of both, to maintain the fluid in liquid state. The invention is suitable for use in connection with storage tanks for any fluid which assumes a gaseous state at normal atmospheric and temperature conditions.

In order to keep such fluid under low temperature and high pressure for a substantial length of time, the metal vessel 20 must be insulated by any suitable covering material such as indicated at 21. In addition, it is necessary to employ one or more relief valves 22. Due to the temperature differential between the liquid in the vessel and the surrounding atmosphere, heat will eventually travel into the liquid to increase the internal pressure in the vessel, the rate of heat flow being dependent upon the efficiency of the insulation. The object of the relief valves is to relieve the pressure in the vessel when it reaches a preset pressure level.

The relief valve 22 includes an external main body fitting 23 of suitable metal which is secured by means of bolts 24 or by any other suitable means to the tank in a manner to bring the bore 25 of the valve fitting in registration with an opening 26 in the tank or vessel 20. The relief valve includes a valve member 27 which is normally maintained in closed position with respect to a seat 28 by a spring 29. The relief valve is capable of relieving pressure in response to abnormal conditions within the tank.

If a relief valve, as just described and illustrated, were used without anything more, the moisture in the warm atmosphere would condense on the cold external metal parts, causing the valve member 27 to freeze on its seat and prevent the valve member 27 from moving in relation to the valve seat when required. In order to prevent this from occurring, it has heretofore been customary to have relief valves "carried warm," that is, relief valves have been mounted on long nozzle extensions which project from the vessel so that the operating parts are warm enough to prevent condensation. Such extension nozzles, however, represent a considerable thermal bridge, that is, the relatively long extension pipes conduct a considerable amount of heat into the tank to reduce considerably the length of time that a fluid such as $CO_2$ can be kept in a liquid state.

The novel means of the present invention for solving the aforementioned problems eliminates the necessity of carrying the valve on a long extension tube. With the present invention the upper end of the valve fitting 23 has an upstanding cup-shaped extension 30 surrounding the valve member 27. This extension is internally threaded as at 31 to receive the externally-threaded lower end of a protection tube 32. The tube 32 is formed of material of low thermal conductivity, such as plastic reinforced with glass fibers, to thus prevent the heat of the atmosphere from being conducted to the valve member 27. Within the tube 32, near the upper end thereof, is a vent conduit 33 in the form of an elbow. The outlet end of the conduit extends through a side of the protecting tube 32 and is in communication with the atmosphere, as at 34. The inlet end 35 of the exhaust conduit is positioned to be normally closed by a diphragm 36 of thin flexible material, such as silicone rubber or any other material having similar attributes. The diaphragm may be detachably held in position by an external O-ring 37 coacting with a groove 38 near the upper end of the tube 32.

With the above arrangement, the environment in which the relief valve is located is kept free of moisture, as there is no moisture within the plastic reinforced with glass fibers protecting tube 32 except that which might be contained in the air at the time of initial assembly. If desired or necessary, this can be taken care of by removing a plug 39 and purging the interior of the tube 32 with nitrogen gas after assembly. The outside atmosphere has little effect on the valve member 27 because it is kept out of contact with the valve member 27 by the insulating tube 32. The covering 21 of insulation over the storage tank 20 is rounded up over the external metal parts 23 and 30 of the valve fitting assembly to cover the latter and also covers the lower portion of protection tube 32.

During use, any small leakage through the relief valve 22, which sometimes occurs, will increase the pressure within the insulating protecting tube 32. This increase in pressure will deflect the diaphragm 36 upwardly and the pressure will be relieved to the atmosphere through the vent conduit 33–34 without admitting any moisture to the vicinity of the valve member 27. The vent conduit 33 is relatively small, usually about one-quarter inch pipe, and is therefore not large enough for major relief. In case, however, of an abnormal pressure condition within the tank 20 triggering the relief valve 27, the silicone rubber diaphragm 36 will break or fly off, allowing for major relief through the top of the insulating tube 32. This last will seldom occur. Therefore, during all normal use of the relief valve, the diaphragm remains intact and the usual small leakage is adequately vented, while the relief valve 27 is thoroughly protected from heat and moisture by the insulating tube and diaphragm.

Various changes and modifications may be made without departing from the spirit of the invention, and all of such changes are contemplated as may come within the scope of the claims.

What I claim is:

1. In an insulated fluid tank for cryogenic service having a relief valve with an external portion including a valve member, supported directly on said tank, a protecting cover formed of material of low thermal conductivity supported in a position surrounding and covering said valve member and projecting externally of the tank therefrom, vent means carried by said protecting covering and having an inlet end within the interior of said protecting cover and having an outlet end communicating with the atmosphere constituting the sole means for communication between the interior of the cover and the atmosphere, and means outwardly of said vent means normally directly closing said inlet end of said vent means to normally prevent admission of atmosphere to the interior of the cover and so supported as to be responsive to minor pressure within said protecting cover, when there is minor leakage past said valve member, for opening said inlet end of said vent means.

2. In a fluid tank for cryogenic service having a relief valve with an external portion including a valve member, a protecting tube formed of material of low thermal conductivity surrounding said valve member and projecting externally of the tank therefrom and having an outer end, a vent pipe carried by said tube and having an inlet end within the interior of said protecting tube and having an outlet end communicating with the atmosphere constituting the sole means for communication between the interior of the cover and the atmosphere, means outwardly of said vent pipe closing said protecting tube and so positioned with respect to the inlet end of said vent pipe as to also normally close the latter, said last means being responsive to minor pressure within the protecting tube, when there is minor leakage past said valve member, for opening said inlet end of said vent means, and insulation covering said tank and the portions of the relief valve which are external of said protecting tube.

3. In an insulated fluid tank for cryogenic service having a relief valve with an external portion including a valve member, a protecting tube formed of material of low thermal conductivity surrounding said valve member and projecting externally of the tank therefrom and having an outer end, vent means carried by said tube and having an inlet end within the interior of said protecting tube and having an outlet end communicating with the atmosphere constituting the sole means for communication between the interior of the cover and the atmosphere, and movable means closing said protecting tube and so positioned with respect to the inlet end of said vent means as to also normally close the latter, said movable closing means being responsive to minor pressure within the protecting tube, when there is minor leakage past said valve member, for opening said inlet end of said vent means and being formed of material which is breakable in response to abnormal pressure.

4. In an insulated fluid tank for cryogenic service having a relief valve with an external portion including a valve member, a protecting tube formed of material of low thermal conductivity surrounding said valve member and projecting externally of the tank therefrom and having an outer end, vent means carried by said tube and having an inlet end within the interior of said protecting tube and having an outlet end communicating with the atmosphere constituting the sole means for communication between the interior of the cover and the atmosphere, and a flexible diaphragm closing the protecting tube and so positioned with respect to the inlet end of said vent means as to normally close the latter, said diaphragm being responsive to minor pressure within the protecting tube when there is minor leakage past said valve member for opening said inlet end of said vent means and being formed of material which is breakable in response to abnormal pressure.

References Cited by the Examiner

UNITED STATES PATENTS

| | | | |
|---|---|---|---|
| 2,226,732 | 12/40 | McBride | 137—71 |
| 2,434,956 | 1/48 | Prentiss | 137—375 X |
| 2,456,195 | 12/48 | Jackson | 137—71 |
| 2,603,231 | 7/52 | Birkemeier | 137—469 X |
| 2,990,841 | 7/61 | Haddad | 137—178 |
| 3,079,946 | 3/63 | Rosler | 137—509 |

M. CARY NELSON, *Primary Examiner.*